(12) United States Patent
Shirahata et al.

(10) Patent No.: US 7,585,478 B2
(45) Date of Patent: Sep. 8, 2009

(54) EXHAUST-GAS PURIFYING CATALYST

(75) Inventors: Junya Shirahata, Ogasa-gun (JP);
Kohei Tomiyasu, Ogasa-gun (JP);
Kazunori Ito, Ogasa-gun (JP)

(73) Assignee: Cataler Corporation, Shizuoka (JP)

( * ) Notice: Subject to any disclaimer, the term of this patent is extended or adjusted under 35 U.S.C. 154(b) by 762 days.

(21) Appl. No.: 11/010,363

(22) Filed: Dec. 14, 2004

(65) Prior Publication Data

US 2005/0170953 A1    Aug. 4, 2005

(30) Foreign Application Priority Data

Jan. 29, 2004    (JP) .............................. 2004-021873

(51) Int. Cl.
| | |
|---|---|
| B01D 53/34 | (2006.01) |
| B01D 53/94 | (2006.01) |
| B01D 50/00 | (2006.01) |
| B01J 8/02 | (2006.01) |
| B01J 23/00 | (2006.01) |
| C01B 21/00 | (2006.01) |
| C01B 23/00 | (2006.01) |
| C01B 25/00 | (2006.01) |
| C01B 33/00 | (2006.01) |
| C01G 28/00 | (2006.01) |

(52) U.S. Cl. ................. 423/213.5; 423/212; 423/213.2; 422/168; 422/169; 502/325

(58) Field of Classification Search ................. 422/168, 422/169; 502/325; 423/213.5, 212, 213.2; 60/299
See application file for complete search history.

(56) References Cited

U.S. PATENT DOCUMENTS

| | | | |
|---|---|---|---|
| 6,254,842 B1 | 5/1991 | Hu et al. | |
| 5,510,086 A * | 4/1996 | Hemingway et al. | 422/171 |
| 5,849,254 A * | 12/1998 | Suzuki et al. | 423/213.5 |
| 6,087,298 A * | 7/2000 | Sung et al. | 502/333 |
| 6,294,141 B1 * | 9/2001 | Twigg et al. | 423/213.7 |
| 2001/0031699 A1* | 10/2001 | Matsumoto et al. | 502/303 |
| 2002/0044896 A1* | 4/2002 | Maus et al. | 422/168 |

FOREIGN PATENT DOCUMENTS

| | | |
|---|---|---|
| EP | 0 427 494 A2 | 5/1991 |
| EP | 0 470 653 A1 | 2/1992 |

(Continued)

*Primary Examiner*—Karl E Group
*Assistant Examiner*—Noah S Wiese
(74) *Attorney, Agent, or Firm*—Oliff & Berridge, PLC

(57) ABSTRACT

An exhaust-gas purifying catalyst includes a mantle, two or more honeycomb-shaped supports fastened in the mantle so as to be separated at intervals, and a catalytic layer disposed on the respective honeycomb-shaped supports. The honeycomb-shaped supports include a first honeycomb-shaped support, disposed on a most upstream side of the mantle with respect to a flow of exhaust gases, and a second honeycomb-shaped support, disposed next to the first honeycomb-shaped support on a downstream side of the mantle with respect to the flow of exhaust gases. The catalytic layer includes a loading layer formed on the respective honeycomb-shaped supports, and a catalytic ingredient loaded on the loading layer. The catalytic layer disposed on the first honeycomb-shaped support includes at least Rh in a loading amount of 0.8 g or more with respect to 1 L of an apparent volume of the first honeycomb-shaped support.

12 Claims, 3 Drawing Sheets

FOREIGN PATENT DOCUMENTS

| | | |
|---|---|---|
| EP | 1 136 115 A1 | 9/2001 |
| JP | A 06-099076 | 4/1994 |
| JP | A 06-205983 | 7/1994 |
| WO | WO 01/37978 A1 | 5/2001 |
| WO | WO 01/74476 A1 | 10/2001 |

* cited by examiner

EXHAUST-GAS PURIFYING CATALYST

BACKGROUND OF THE INVENTION

1. Field of the Invention

The present invention relates to an exhaust-gas purifying catalyst. More specifically, it relates to an exhaust-gas purifying catalyst which is good in terms of the catalytic ignitability.

2. Description of the Related Art

As the concerns over the environmental issues have been growing recently, the measures against exhaust gases emitted from internal combustion engines such as automobile engines have been taken seriously. It is because problems such as pollution and environmental deterioration have occurred when exhaust gases emitted from internal combustion engines are emitted into the atmosphere as they are. Hence, the exhaust gases are emitted into the atmosphere after they are purified by exhaust-gas purifying catalysts.

Exhaust-gas purifying systems using exhaust-gas purifying catalysts have been employed widely, because they can reduce the exhaust-gas emission remarkably, compared with the other measures, without applying so much load to internal combustion engines, such as automobile engines, which emit exhaust gases.

In general, exhaust-gas purifying catalysts are made in the following manner. A porous loading layer is formed on a surface of a catalyst support substrate which exhibits heat resistance. The loading layer is composed of heat-resistant inorganic oxides, such as alumina. A catalytic ingredient is loaded on the loading layer. The exhaust-gas purifying catalysts convert nitrogen oxides ($NO_x$), hydrocarbons (HC) and carbon monoxide (CO), which are contained in exhaust gases, into unharmful nitrogen, carbon dioxide and water, respectively, by the action of catalytic ingredients.

It has been known that the exhaust-gas purifying performance of catalytic ingredients is affected strongly by temperature. In general, when purifying exhaust gases with catalytic ingredients, the purification has been carried out at a temperature of 300° C. or more. Accordingly, when the temperature of exhaust gases is low, such as immediately after starting automotive engines, the catalytic activity of catalytic ingredients is so low that it has been difficult to purify exhaust gases satisfactorily.

As a method for improving the purifying performance and ignition performance of exhaust-gas purifying catalysts, it has been known to increase the loading amount of catalytic ingredients. Moreover, as a method of upgrading the ignition performance of exhaust-gas purifying catalysts, a method is available which uses a plurality of catalyst support substrates. For example, Japanese Unexamined Patent Publication (KOKAI) No. 6-99,076 and Japanese Unexamined Patent Publication (KOKAI) No. 6-205,983 disclose such exhaust-gas purifying catalysts.

Japanese Unexamined Patent Publication (KOKAI) No. 6-99,076 discloses a metallic support catalyst. The metallic catalyst comprises two catalyst support substrates, a loading layer, and Pt and Rh. The catalyst support substrates are fastened so as to be separated at an interval. The loading layer is formed on a surface of the respective catalyst support substrates. The Pt and Rh are loaded on the loading layer in an amount of 1.0 g and 0.2 g with respect to 1 L of an apparent volume of the catalyst support substrates, respectively.

Japanese Unexamined Patent Publication (KOKAI) No. 6-205,983 discloses an exhaust-gas purifying catalyst which comprises two catalyst support substrates, a loading layer, and Pt and Rh. Similarly, the catalyst support substrates are fastened so as to be separated at an interval. The loading layer is formed on a surface of the respective catalyst support substrates. The Pt and Rh are loaded on the loading layer. However, the exhaust-gas purifying catalyst is characterized in that one of the catalytic ingredients, Pt, is loaded in a greater loading amount on an upstream side of the respective loading layers. For example, in the exhaust-gas purifying catalyst, the Pt and Rh are loaded on an upstream portion of the loading layer formed on the upstream-side catalyst support substrate in an amount of 10.0 g and 0.3 g with respect to 1 L of an apparent volume of the upstream-side catalyst support substrate, respectively; and the Pt and Rh are loaded on the other portion of the loading layer formed on the upstream-side catalyst support substrate in an amount of 1.5 g and 0.3 g with respect to 1 L of an apparent volume of the upstream-side catalyst support substrate, respectively. Moreover, the Pt and Rh are loaded on the loading layer formed on the downstream-side catalyst support substrate in an amount of 10.0 g and 0.3 g with respect to 1 L of an apparent volume the downstream-side catalyst support substrate, respectively.

Note that it has been required for conventional exhaust-gas purifying catalysts, involving the exhaust-gas purifying catalysts disclosed in the aforementioned patent publications, to exhibit furthermore enhanced performance.

SUMMARY OF THE INVENTION

The present invention has been developed in view of the aforementioned circumstances. It is therefore an object of the present invention to provide an exhaust-gas purifying catalyst which has such good ignition performance that it exhibits effective purifying activity even in a low temperature region, such as immediately after automotive engines are started.

The inventors of the present invention studied exhaust-gas purifying catalysts over and over again. As a result, they found out that it is possible to achieve the object when rhodium (Rh), one of catalytic ingredients, is loaded more on an inlet side of exhaust-gas purifying catalysts with respect to a flow of exhaust gases. Thus, they completed the present invention.

For example, an exhaust-gas purifying catalyst according to the present invention comprises:

a mantle;

two or more honeycomb-shaped supports fastened in the mantle so as to be separated at intervals, and comprising a first honeycomb-shaped support disposed on a most upstream side of the mantle with respect to a flow of exhaust gases and a second honeycomb-shaped support disposed next to the first honeycomb-shaped support on a downstream side of the mantle with respect to the flow of exhaust gases; and a catalytic layer disposed on a surface of the respective honeycomb-shaped supports, and comprising a loading layer formed on a surface of the respective honeycomb-shaped supports and a catalytic ingredient loaded on the loading layer, the catalytic layer disposed on a surface of the first honeycomb-shaped support including at least rhodium (Rh) as the catalytic ingredient in a loading amount of 0.8 g or more with respect to 1 L of an apparent volume of the first honeycomb-shaped support.

The present exhaust-gas purifying catalyst comprises the catalytic layer which is disposed on a surface of the first honeycomb-shaped support and which includes Rh loaded in an amount of 0.8 g or more with respect to 1 L of an apparent volume of the first honeycomb-shaped support. Therefore, the present exhaust-gas purifying catalyst effects advantages that it exhibits not only good purifying performance but also upgraded ignition performance. Moreover, the present exhaust-gas purifying catalyst can be produced with a reduced loading amount of catalytic ingredient, because Rh gives exhaust-gas purifying catalysts better ignition performance with a less loading amount than platinum (Pt) and palladium (Pd) do.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
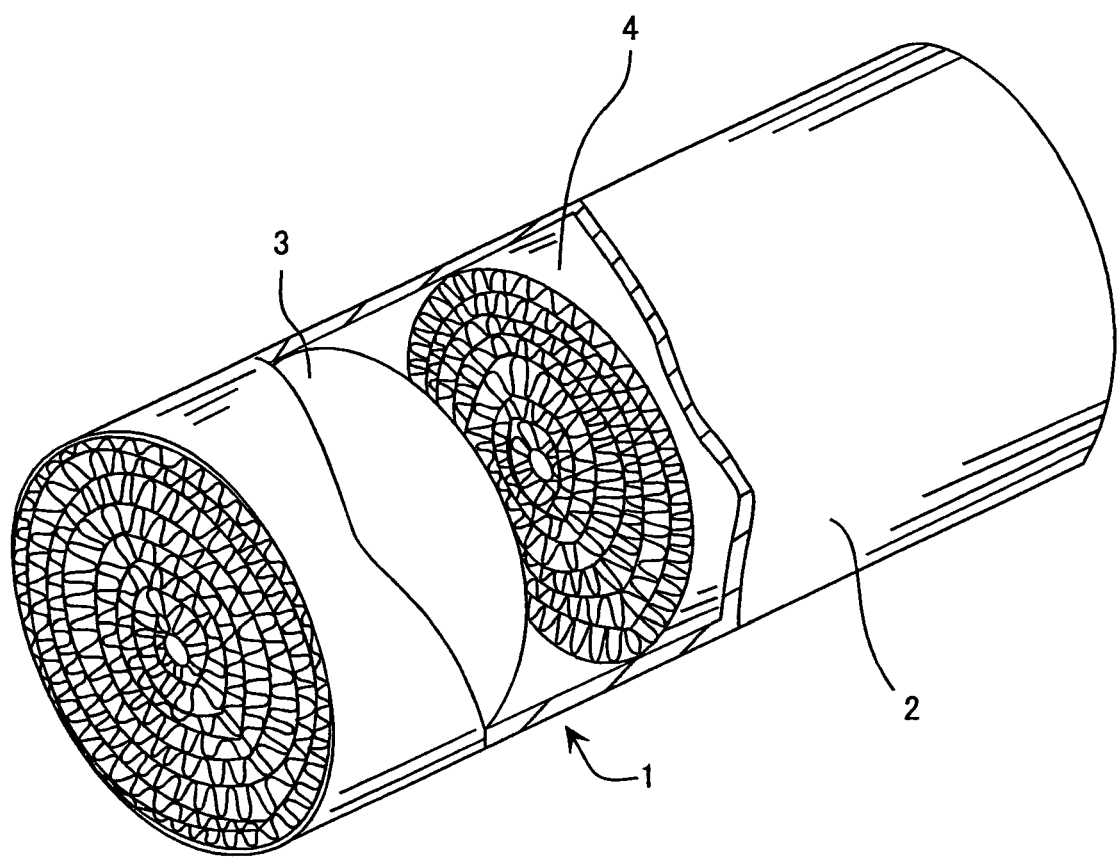
FIG. 1 is a perspective view, which is cut away partially, for illustrating an arrangement of an exhaust-gas purifying catalyst according to Example No. 1 of the present invention.

Having generally described the present invention, a further understanding can be obtained by reference to the specific preferred embodiments which are provided herein for the purpose of illustration only and not intended to limit the scope of the appended claims.

The present exhaust-gas purifying catalyst comprises a mantle, two or more honeycomb-shaped supports, and a catalytic layer.

In the mantle, that is, in the axial hollow of the mantle, the two or more honeycomb-shaped supports are fastened. Moreover, exhaust gases flow through the inside of the mantle. The mantel can be composed of metals. As for the metals forming the mantle, it is possible to use heat-resistant metals which have been used in conventionally known pipe-shaped catalysts. As for the heat-resistant metals, it is possible to name stainless steel, for instance.

The two or more honeycomb-shaped supports are fastened in the mantle so as to be separated at intervals. The honeycomb-shaped supports comprise a large number of cells which communicate one of the opposite ends of the honeycomb-shaped supports with the other one of them axially. The honeycomb-shaped supports are disposed in the mantle so that the extension direction of cells coincides with the axial direction of the mantle. The present exhaust-gas purifying catalyst comprises two or more independent component catalysts disposed in the mantle, because the two or more honeycomb-shaped supports are fastened in the mantle so as to be separated at intervals. As a result, one of the independent component catalysts, an independent component catalyst which is disposed on a most upstream side of the mantle with respect to a flow of exhaust gases, upgrades the ignition performance of the present exhaust-gas purifying catalyst. The honeycomb-shaped supports can be composed of metals. The honeycomb-shaped supports composed of metals enable the temperature of the respective independent component catalysts to rise quickly. As for the metals forming the honeycomb-shaped supports, it is possible to use heat-resistant metals. As for the heat-resistant metals, it is possible to name stainless steel, for instance.

The catalytic layer is disposed on a surface of the respective honeycomb-shaped supports, and comprises a loading layer and a catalytic ingredient. The loading layer is formed on a surface of the respective honeycomb-shaped supports. The catalytic ingredient is loaded on the loading layer. The catalytic layer purifies exhaust gases upon contacting with them. The catalytic layer can comprise the same loading layer and catalytic ingredient as those of conventionally known exhaust-gas purifying catalysts. For example, as for the loading layer, it is possible to use loading layers formed of heat-resistant inorganic oxides, such as alumina. Note that the loading layer can further comprise conventionally known additives, such as ceria and zirconia, dispersed therein. As for the catalytic ingredient, it is possible to use Pt, Pd or Rh.

The two or more honeycomb-shaped supports comprise a first honeycomb-shaped support, and a second honeycomb-shaped support. The first honeycomb-shaped support is disposed on a most upstream side of the mantle with respect to a flow of exhaust gases. The second honeycomb-shaped support is disposed next to the first honeycomb-shaped support on a downstream side of the mantle with respect to the flow of exhaust gases. In the present exhaust-gas purifying catalyst, the catalytic layer disposed on a surface of the first honeycomb-shaped support (hereinafter referred to as "most-upstream-side catalytic layer" wherever appropriate) includes at least Rh as the catalytic ingredient in a loading amount of 0.8 g or more with respect to 1 L of an apparent volume of the first honeycomb-shaped support. On the other hand, in conventional exhaust-gas purifying catalysts, the catalytic layer usually includes Rh in a loading amount of from 0.2 to 0.4 g approximately with respect to 1 L of an apparent volume of the support. In the present exhaust-gas purifying catalyst, Rh is loaded in an amount of 0.8 g or more with respect to 1 L of an apparent volume of the first honeycomb-shaped support, a loading amount far greater than the conventional loading amount. In the present exhaust-gas purifying catalyst, a first independent component catalyst formed on a surface of the first honeycomb-shaped support is upgraded in terms of the ignition performance and purifying performance, because the most-upstream-side catalytic layer includes Rh abundantly. Note that Rh produces better ignition performance with a less loading amount than Pt and Pd do. Thus, Rh gives the present exhaust-gas purifying catalyst the advantage better with reduced noble metal consumption than both Pt and Pd are used. The most-upstream-side catalytic layer can preferably includes Rh in a loading amount of from 1 to 5 g, further preferably from 1.5 to 3 g, with respect to 1 L of an apparent volume of the first honeycomb-shaped support.

In the present exhaust-gas purifying catalyst, the two or more honeycomb-shaped supports are fastened in the mantle, and the catalytic layer is formed on the respective honeycomb-shaped supports. That is, the present exhaust-gas purifying catalyst comprises two or more independent component catalysts. Thus, in the present exhaust-gas purifying catalyst, the quantity of independent component catalysts can be two or more. However, the quantity of independent component catalysts can preferably be no more than two, because the more the quantity of independent component catalysts is the higher the production cost goes up.

The most-upstream-side catalytic layer can preferably further include one or more catalytic ingredients loaded thereon, in addition to Rh. The loading amount of catalytic ingredients other than Rh is not limited in particular. The loading amount can be arranged to such amounts that the catalytic ingredients other than Rh are loaded on conventional exhaust-gas purifying catalysts. For example, Pt and Pd can be loaded on the most-upstream-side catalytic layer in an amount of from 0.5 to 2.0 g and from 0.5 to 2.0 g, respectively, with respect to 1 L of an apparent volume of the first honeycomb-shaped support.

The catalytic layer, disposed on a surface of each of the other honeycomb-shaped supports of the two or more honeycomb-shaped supports (i.e., the two or more honeycomb-shaped supports excepting the first honeycomb-shaped support), can preferably include one or more catalytic ingredients loaded thereon. The loading amount of catalytic ingredients is not limited in particular. However, when loading Rh on the catalytic layer disposed on a surface of each of the honeycomb-shaped supports other than the first honeycomb-shaped support, the Rh loading amount can preferably be arranged so that it is less than the Rh loading amount on the catalytic layer disposed on the first honeycomb-shaped support. For example, the catalytic layer disposed on the surface of the honeycomb-shaped supports excepting the first honeycomb-shaped support can preferably include Rh as the catalytic ingredient in a loading amount less than that of the catalytic layer disposed on the first honeycomb-shaped support by a factor of from 0.1 to 0.7, further preferably from 0.4 to 0.6. Moreover, when the quantity of the honeycomb-shaped catalysts excepting the first honeycomb-shaped support is more than two, it is possible to appropriately change the loading amount of the catalytic ingredient on each of the catalytic layers, disposed on the honeycomb-shaped catalysts excepting the first honeycomb-shaped support, respectively. In addition, the loading amount of the catalytic ingredient on the catalytic layer, disposed on a surface of each of the honeycomb-shaped supports excepting the first honeycomb-shaped support, can be arranged to such an amount that the catalytic ingredient is loaded on conventional exhaust gas purifying catalysts. For example, Pt, Pd and Rh can be loaded on the catalytic layer, disposed on a surface of each of the honeycomb-shaped supports excepting the first honeycomb-shaped support, in an amount of from 0.5 to 2.0 g, from 0.5 to 2.0 g, and from 0.2 to 0.5 g, respectively, with respect to 1 L of an apparent volume of each of the honeycomb-shaped supports excepting the first honeycomb-shaped support.

In general, the more the catalytic ingredient is loaded the more the resulting catalyst is enhanced in terms of the exhaust-gas purifying performance. However, the production cost has gone up remarkably.

The first honeycomb-shaped support can preferably have an axial length of from 10 to 30 mm. When the axial length of the first honeycomb-shaped support is 30 mm or less, the first independent component catalyst is upgraded in terms of the ignition performance. That is, the temperature increment rate of the first honeycomb support and that of the most-upstream-side catalytic layer surge when the first honeycomb-shaped support is shortened axially. On the other hand, lengthening the axial length of the first honeycomb-shaped support results in a sharp increase in the production cost when loading Rh on the most-upstream-side catalytic layer. The shorter the axial length of the first honeycomb-shaped support the more preferable it is in view of the ignition performance. However, when the axial length of the first honeycomb-shaped support is less than 10 mm, the exhaust-gas blow-by (or exhaust-gas leakage) has occurred to degrade the ignition performance of resulting exhaust-gas purifying catalysts. Moreover, when the axial length of the first honeycomb-shaped support is less than 10 mm, it is difficult to manufacture such honeycomb-shaped supports. Note that the axial length of the first honeycomb-shaped support can further preferably be from 15 to 25 mm.

A summed axial length of the honeycomb-shaped supports excepting the first honeycomb-shaped support can preferably be longer than that of the first honeycomb-shaped support. When a summed axial length of the honeycomb-shaped supports excepting the first honeycomb-shaped substrate is longer than that of the first honeycomb-shaped substrate, the present exhaust-gas purifying catalyst has a catalytic layer with a sufficient length as a whole so that it can secure satisfactory exhaust-gas purifying performance.

An axial length of the second honeycomb-shaped support disposed next to the first honeycomb-shaped support can preferably be longer than that of the first honeycomb-shaped support. When the axial length of the second honeycomb-shaped support is longer than that of the first honeycomb-shaped support, the independent component catalyst formed on the second honeycomb-shaped support comprises the catalytic layer whose axial length is longer than that of the catalytic layer of the first independent component catalyst formed on the first honeycomb-shaped support. Thus, the present exhaust-gas purifying catalyst can show enhanced exhaust-gas purifying performance. Note that the axial length of the second honeycomb-shaped support disposed next to the first honeycomb-shaped support can further preferably be longer than that of the first honeycomb-shaped support by from 20 to 150 mm, furthermore preferably from 40 to 120 mm.

The interval between the first honeycomb-shaped support and the second honeycomb-shaped support disposed next to the first honeycomb-shaped support can preferably fall in a range of from 5 to 50 mm. When the interval between the first honeycomb-shaped support and the second honeycomb-shaped support falls in the range, the present exhaust-gas purifying catalyst can show not only high ignition performance but also upgraded exhaust-gas purifying performance. When the interval between the first honeycomb-shaped support and the second honeycomb-shaped support is less than 5 mm, the two independent component catalysts formed on the two honeycomb-shaped supports are disposed so closely that the turbulence of exhaust gases are less likely to occur between the two independent component catalysts. Accordingly, the overall exhaust-gas purifying efficiency might degrade. On the other hand, when the interval between the first honeycomb-shaped support and the second honeycomb-shaped support is more than 50 mm, the second independent component catalyst formed on the second honeycomb-shaped support is separated so away from the first independent component catalyst formed on the first honeycomb-shaped support that the second independent component catalyst might not utilize the enhanced ignition performance, the advantage produced by the first independent component catalyst, effectively. Consequently, the effective performance as an exhaust-gas purifying catalyst might degrade as a whole. Moreover, when the interval between the first honeycomb-shaped support and the second honeycomb-shaped support is too long, the resulting exhaust-gas purifying catalysts themselves become so long that their boardability onto vehicles might deteriorate. The interval between the first honeycomb-shaped support and the second honeycomb-shaped support disposed next to the first honeycomb-shaped support can further preferably fall in a range of from 10 to 30 mm.

The present exhaust-gas purifying catalyst can be arranged in the same manner as conventionally known exhaust-gas purifying catalysts, except that two or more independent component catalysts are formed in a mantle; and that one of the independent component catalysts, disposed on a first honeycomb-shaped support positioned on a most upstream side of the mantle with respect to a flow of exhaust gases, includes Rh as a catalytic ingredient in a loading amount of 0.8 g or more with respect to 1 L of an apparent volume of the first honeycomb-shaped support.

The production process of the present exhaust-gas purifying catalyst is not limited in particular. However, the present exhaust-gas purifying catalyst can be produced in the following manner, for example.

A honeycomb-shaped support can be manufactured in the following manner, for instance. A corrugated sheet is formed by bending a strip-shaped metallic sheet. The resulting corrugated sheet is laminated with a strip-shaped flat metallic sheet. The laminated corrugated sheet and flat sheet are wound as a roll. The wound laminate is cut perpendicularly to the axial direction to a predetermined axial length.

After manufacturing two or more of the honeycomb-shaped supports, the resultant honeycomb-shaped supports are fitted into a mantle. The mantle comprises a pipe which has been cut to a predetermined axial length in advance. Then, the honeycomb-shaped supports are fastened in the mantle by brazing.

Thereafter, a slurry for forming a loading layer is coated on a surface of the honeycomb-shaped supports which are fastened in the mantle. After drying and calcining the slurry, a catalytic ingredient comprising Rh is loaded on the resulting loading layer in the same manner as conventional exhaust-gas purifying catalysts.

Thus, in accordance with the above-described production process, it is possible to produce the present exhaust-gas purifying catalyst.

EXAMPLES

Hereinafter, the present invention will be described in more detail with reference to specific examples.

As examples of the present invention, the following exhaust-gas purifying catalysts were produced as hereinafter described.

Example No. 1

First of all, a circle-shaped continuous pipe was prepared which was composed of SUS436L as per Japanese Industrial Standard (JIS). The pipe had a thickness of 1.5 mm, an inside diameter of 50.5 mm, and an outside diameter of 53.5 mm. The pipe was cut to an axial length of 140 mm to manufacture a mantle.

Subsequently, a cylindrical upstream-side honeycomb-shaped support was manufactured which was composed of a high heat-resistance stainless steel. The high heat-resistance stainless steel comprised 20% by weight of Cr, 5% by weight of Al, and the balance of Fe and inevitable impurities. The upstream-side honeycomb-shaped support comprised cells in an amount of 31 cells/cm$^2$ (or 200 cells/inch$^2$ approximately), and had a diameter of 50.5 mm and an axial length of 20 mm. Note that the present first honeycomb-shaped support includes the upstream-side honeycomb-shaped support.

Moreover, a cylindrical downstream-side honeycomb-shaped support was likewise manufactured which was composed of the high heat-resistance stainless steel. The downstream-side honeycomb-shaped support comprised cells in an amount of 31 cells/cm$^2$ (or 200 cells/inch$^2$ approximately), and had a diameter of 50.5 mm and an axial length of 100 mm. Note that the present second honeycomb-shaped support includes the downstream-side honeycomb-shaped support.

Note that the upstream-side honeycomb-shaped support and the downstream-side honeycomb-shaped support were manufactured in the following manner. Two strip-shaped sheets were prepared whose thickness was 100 μm, and were processed into a flat sheet and a corrugated sheet, respectively. The flat sheet and the corrugated sheet were laminated. Then, the laminated flat sheet and corrugated sheet were wound as a roll to manufacture the upstream-side honeycomb-shaped support and downstream-side honeycomb-shaped support.

Then, the upstream-side honeycomb-shaped support was fitted into the mantle through one of the opposite-end openings of the mantle (hereinafter referred to as a "front-end opposite opening"). Note that the front-end opposite surface of the upstream-side honeycomb-shaped support was flush with the front-end opposite surface of the mantle when completing the fitting of the upstream-side honeycomb-shaped support into the mantle. Moreover, the downstream-side honeycomb-shaped support was fitted into the mantle through the other one of the opposite-end openings of the mantle (hereinafter referred to as a "rear-end opposite opening"). Note that the rear-end opposite surface of the downstream-side honeycomb-shaped support was flush with the rear-end opposite surface of the mantle when completing the fitting of the downstream-side honeycomb-shaped support into the mantle.

Thereafter, the upstream-side and downstream honeycomb-shaped supports were fastened in the mantle by brazing in the following manner. The fastening by brazing was carried out using a heat-resistant Ni-based brazing alloy. After applying the heat-resistant Ni-brazing alloy onto an inner peripheral surface of the mantle and onto an outer peripheral surface of the upstream-side and downstream honeycomb-shaped supports, the mantle into which the upstream-side and downstream-side honeycomb-shaped supports were fitted was heated to a high temperature and held thereat in a vacuum atmosphere. Note that the used brazing alloy comprised Cr in an amount of 18% by weight, Si in an amount of 10% by weight, and the balance of Ni and inevitable impurities.

The following were used to prepare a slurry: 65 parts by weight of alumina ($Al_2O_3$); 25 parts by weight of ceria ($CeO_2$); 5 parts by weight of zirconia ($ZrO_2$); 5 parts by weight of a binder; and 100 parts by weight of water. The raw materials were mixed uniformly to prepare a slurry.

The resulting slurry was coated on a surface of the two honeycomb-shaped substrates, the upstream-side honeycomb-shaped support and the downstream-side honeycomb-shaped support, in a coating amount of 50 g/cm$^2$, respectively. After drying the coated slurry, the mantle into which the two honeycomb-shaped supports were fitted (hereinafter referred to as a "support assembly") was calcined at 500° C. for 1 hour. Thus, an upstream-side loading layer and a downstream-side loading layer were formed on the upstream-side honeycomb-shaped support and the downstream-side honeycomb-shaped support, respectively.

Then, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the two loading layers, the upstream-side loading layer and the downstream-side loading layer, in a loading amount of 0.8 g and 0.16 g with respect to 1 L of an apparent volume of the two honeycomb-shaped supports, the upstream-side honeycomb-shaped support and the downstream-side honeycomb-shaped support, respectively.

Thereafter, a rhodium nitrate aqueous solution was further prepared. Only the upstream-side honeycomb-shaped support of the support assembly was immersed into the rhodium nitrate aqueous solution. After taking up the upstream-side honeycomb-shaped support of the support assembly from the rhodium nitrate aqueous solution and drying it, the support assembly was calcined. Note that the calcination was carried out by heating the support assembly at 300° C. for 1 hour. When the process was completed, Rh was further loaded on the upstream-side loading layer in an extra loading amount of 0.8 g with respect to 1 L of an apparent volume of the upstream-side honeycomb-shaped support. That is, Rh was loaded on the upstream-side loading layer in a total loading amount of 0.96 g with respect to 1 L of an apparent volume of the upstream-side honeycomb-shaped support.

In accordance with the above-described procedures, an exhaust-gas purifying catalyst according to Example No. 1 was produced. FIG. 1 illustrates the arrangement of the exhaust-gas purifying catalyst according to Example No. 1.

As illustrated in the drawing, the exhaust-gas purifying catalyst 1 according to Example No. 1 comprised the mantle 2, the upstream-side catalyst 3, and the downstream-side catalyst 4. The upstream-side catalyst 3 was disposed in the mantle 2 on an upstream side with respect to a flow of exhaust gases; and the downstream-side catalyst 4 was disposed at a position where the upstream-end surface of the downstream-side catalyst 4 was positioned away from the downstream-end surface of the upstream-side catalyst 3 at an interval of 20 mm. Note that the upstream-end surface of the upstream-side catalyst 3 agreed with the upstream-end surface of the mantle 2; and the downstream-end surface of the downstream-side catalyst 4 agreed with the downstream-end surface of the mantle 2. Moreover, the upstream-side catalyst 3 comprised the upstream-side honeycomb-shaped support fastened to the mantle 2, and the upstream-side catalytic layer formed on a surface of the upstream-side honeycomb-shaped support; and the downstream-side catalyst 4 comprised the downstream-side honeycomb-shaped support fastened to the mantle 2, and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pt and Rh loaded on the upstream-side loading layer; and the downstream-side catalytic layer comprised the downstream-side loading layer formed on a surface of the downstream-side honeycomb-shaped support, and Pt and Rh loaded on the downstream-side loading layer. Note that Rh was loaded on the upstream-side loading layer in a loading amount of 0.96 g with respect to 1 L of an apparent volume of the upstream-side honeycomb-shaped support.

Table 1 below summarizes the arrangement of the exhaust-gas purifying catalyst according to Example No. 1.

TABLE 1

| | Upstream-side Catalyst | | | | | Intermediate Catalyst | | | | Downstream-side Catalyst | | | |
|---|---|---|---|---|---|---|---|---|---|---|---|---|---|
| | Axial Length | Catalytic Ingredient Loading Amount (g/L) | | | Interval | Length | Catalytic Ingredient Loading Amount (g/L) | | Interval | Axial Length | Catalytic Ingredient Loading Amount (g/L) | | |
| | (mm) | Pt | Rh | Pd | (mm) | (mm) | Pt | Rh | (mm) | (mm) | Pt | Rh | Pd |
| Ex. #1 | 20 | 0.8 | 0.96 | N.A. | N.A. | N.A. | N.A. | N.A. | 20 | 100 | 0.8 | 0.16 | N.A. |
| Ex. #2 | 20 | 0.8 | 2.46 | N.A. | N.A. | N.A. | N.A. | N.A. | 20 | 100 | 0.8 | 0.16 | N.A. |
| Ex. #3 | 20 | N.A. | 0.96 | 0.8 | N.A. | N.A. | N.A. | N.A. | 20 | 100 | N.A. | 0.16 | 0.8 |
| Ex. #4 | 20 | 0.8 | 0.96 | N.A. | 20 | 40 | 0.8 | 0.16 | 20 | 40 | 0.8 | 0.16 | N.A. |
| Comp. Ex. #1 | 120 | 0.8 | 0.3 | N.A. | N.A. | N.A. | N.A. | N.A. | N.A. | N.A. | N.A. | N.A. | N.A. |
| Comp. Ex. #2 | 20 | 0.8 | 0.16 | 1.6 | N.A. | N.A. | N.A. | N.A. | 20 | 100 | 0.8 | 0.16 | N.A. |
| Comp. Ex. #3 | 20 | 2.4 | 0.16 | N.A. | N.A. | N.A. | N.A. | N.A. | 20 | 100 | 0.8 | 0.16 | N.A. |

Note:
N.A. stands for "Not Applicable."

Example No. 2

The component members were used whose material qualities and sizes were the same as those of the component members used in Example No. 1. The two honeycomb-shaped supports, the upstream-side support and the downstream-side support, were fastened in the mantle to prepare the support assembly. Then, the upstream-side and downstream-side loading layers were formed on a surface of the two honeycomb-shaped supports, respectively.

Moreover, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the two loading layers, the upstream-side loading layer and the downstream-side loading layer, in a loading amount of 0.8 g and 0.16 g with respect to 1 L of an apparent volume of the two honeycomb-shaped supports, the upstream-side honeycomb-shaped support and the downstream-side honeycomb-shaped support, respectively.

In addition, a rhodium nitrate aqueous solution was further prepared. Only the upstream-side honeycomb-shaped support of the support assembly was immersed into the rhodium nitrate aqueous solution. After taking up the upstream-side honeycomb-shaped support of the support assembly from the rhodium nitrate aqueous solution and drying it, the support assembly was calcined. Note that the calcination was carried out by heating the support assembly at 300° C. for 1 hour.

When the process was completed, Rh was further loaded on the upstream-side loading layer in an extra loading amount of 2.3 g with respect to 1 L of an apparent volume of the upstream-side honeycomb-shaped support. That is, Rh was loaded on the upstream-side loading layer in a total loading amount of 2.46 g with respect to 1 L of an apparent volume of the upstream-side honeycomb-shaped support.

In accordance with the above-described procedures, an exhaust-gas purifying catalyst according to Example No. 2 was produced.

The exhaust-gas purifying catalyst according to Example No. 2 comprised the mantle, the upstream-side catalyst, and the downstream-side catalyst. The upstream-side catalyst was disposed in the mantle on an upstream side with respect to a flow of exhaust gases; and the downstream-side catalyst was disposed at a position where the upstream-end surface of the downstream-side catalyst was positioned away from the downstream-end surface of the upstream-side catalyst at an interval of 20 mm. Note that the upstream-end surface of the upstream-side catalyst agreed with the upstream-end surface of the mantle; and the downstream-end surface of the downstream-side catalyst agreed with the downstream-end surface of the mantle. Moreover, the upstream-side catalyst comprised the upstream-side honeycomb-shaped support fastened to the mantle, and the upstream-side catalytic layer formed on a surface of the upstream-side honeycomb-shaped support; and the downstream-side catalyst comprised the downstream-side honeycomb-shaped support fastened to the mantle, and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pt and Rh loaded on the upstream-side loading layer; and the downstream-side catalytic layer comprised the downstream-side loading layer formed on a surface of the downstream-side honeycomb-shaped support, and Pt and Rh loaded on the downstream-side loading layer. Note that Rh was loaded on the upstream-side loading layer in a loading amount of 2.46 g with respect to 1 L of an apparent volume of the upstream-side honeycomb-shaped support.

Table 1 above summarizes the arrangement of the exhaust-gas purifying catalyst according to Example No. 2 as well.

Example No. 3

The component members were used whose material qualities and sizes were the same as those of the component members used in Example No. 1. The two honeycomb-shaped supports, the upstream-side support and the downstream-side support, were fastened in the mantle to prepare the support assembly. Then, the upstream-side and downstream-side loading layers were formed on a surface of the two honeycomb-shaped supports, respectively.

Moreover, a rhodium nitrate aqueous solution and a palladium nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pd and Rh were loaded on the two loading layers, the upstream-side loading layer and the downstream-side loading layer, in a loading amount of 0.8 g and 0.16 g with respect to 1 L of an apparent volume of the two honeycomb-shaped supports, the upstream-side honeycomb-shaped support and the downstream-side honeycomb-shaped support, respectively.

In addition, a rhodium nitrate aqueous solution was further prepared. Only the upstream-side honeycomb-shaped support of the support assembly was immersed into the rhodium nitrate aqueous solution. After taking up the upstream-side honeycomb-shaped support of the support assembly from the rhodium nitrate aqueous solution and drying it, the support assembly was calcined. Note that the calcination was carried out by heating the support assembly at 300° C. for 1 hour. When the process was completed, Rh was further loaded on the upstream-side loading layer in an extra loading amount of 0.8 g with respect to 1 L of an apparent volume of the upstream-side honeycomb-shaped support. That is, Rh was loaded on the upstream-side loading layer in a total loading amount of 0.96 g with respect to 1 L of an apparent volume of the upstream-side honeycomb-shaped support.

In accordance with the above-described procedures, an exhaust-gas purifying catalyst according to Example No. 3 was produced.

The exhaust-gas purifying catalyst according to Example No. 3 comprised the mantle, the upstream-side catalyst, and the downstream-side catalyst. The upstream-side catalyst was disposed in the mantle on an upstream side with respect to a flow of exhaust gases; and the downstream-side catalyst was disposed at a position where the upstream-end surface of the downstream-side catalyst was positioned away from the downstream-end surface of the upstream-side catalyst at an interval of 20 mm. Note that the upstream-end surface of the upstream-side catalyst agreed with the upstream-end surface of the mantle; and the downstream-end surface of the downstream-side catalyst agreed with the downstream-end surface of the mantle. Moreover, the upstream-side catalyst comprised the upstream-side honeycomb-shaped support fastened to the mantle, and the upstream-side catalytic layer formed on a surface of the upstream-side honeycomb-shaped support; and the downstream-side catalyst comprised the downstream-side honeycomb-shaped support fastened to the mantle, and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pd and Rh loaded on the upstream-side loading layer; and the downstream-side catalytic layer comprised the downstream-side loading layer formed on a surface of the downstream-side honeycomb-shaped support, and Pd and Rh loaded on the downstream-side loading layer. Note that Rh was loaded on the upstream-side loading layer in a loading amount of 0.96 g with respect to 1 L of an apparent volume of the upstream-side honeycomb-shaped support.

Table 1 above summarizes the arrangement of the exhaust-gas purifying catalyst according to Example No. 3 as well.

Example No. 4

First of all, a circle-shaped continuous pipe was prepared which was composed of SUS436L as per Japanese Industrial Standard (JIS). The pipe had a thickness of 1.5 mm, an inside diameter of 50.5 mm, and an outside diameter of 53.5 mm. The pipe was cut to an axial length of 140 mm to manufacture a mantle.

Subsequently, a cylindrical upstream-side honeycomb support was manufactured which was composed of the above-described high heat-resistance stainless steel. The upstream-side honeycomb-shaped support comprised cells in an amount of 31 cells/cm$^2$ (or 200 cells/inch$^2$ approximately), and had a diameter of 50.5 mm and an axial length of 20 mm. Note that the present first honeycomb-shaped support includes the upstream-side honeycomb-shaped support.

Moreover, a cylindrical intermediate honeycomb-shaped support was likewise manufactured which was composed of the high heat-resistance stainless steel. The intermediate honeycomb support comprised cells in an amount of 31 cells/cm$^2$ (or 200 cells/inch$^2$ approximately), and had a diameter of 50.5 mm and an axial length of 40 mm. Note that the present second honeycomb-shaped support includes the intermediate honeycomb-shaped support.

In addition, a cylindrical downstream-side honeycomb-shaped support was likewise manufactured which was composed of the high heat-resistance stainless steel. The downstream-side honeycomb-shaped support comprised cells in an amount of 31 cells/cm$^2$ (or 200 cells/inch$^2$ approximately), and had a diameter of 50.5 mm and an axial length of 40 mm.

Then, the intermediate honeycomb-shaped support was fitted into the mantle through one of the opposite-end openings of the mantle (hereinafter referred to as a "front-end opposite opening"). Note that the intermediate honeycomb-shaped support was fitted into the mantle until the front-end opposite surface of the intermediate honeycomb-shaped support was positioned away from the front-end opposite surface of the mantle by a distance of 40 mm. Moreover, the upstream-side honeycomb-shaped support was fitted into the mantle through the front-end opposite opening. Note that the front-end opposite surface of the upstream-side honeycomb-shaped support was flush with the front-end opposite surface of the mantle when completing the fitting of the upstream-side honeycomb-shaped support into the mantle. In addition, the downstream-side honeycomb-shaped support was fitted into the mantle through the other one of the opposite-end openings of the mantle (hereinafter referred to as a "rear-end opposite opening"). Note that the rear-end opposite surface of the downstream-side honeycomb-shaped support was flush with the rear-end opposite surface of the mantle when completing the fitting of the downstream-side honeycomb-shaped support into the mantle. Thus, in the mantel whose axial length was 140 mm, there are disposed the upstream-side honeycomb-shaped support whose axial length was 20 mm, the intermediate honeycomb-shaped support whose axial length was 40 mm and the downstream-side honeycomb-shaped support whose axial length was 40 mm in the following disposition. The intermediate honeycomb-shaped support was disposed at a position where the front-end opposite opening of the intermediate honeycomb-shaped support was positioned away from the rear-end opposite opening of the upstream-side honeycomb-shaped support by a distance of 20 mm; and the downstream-side honeycomb-shaped support was disposed at a position where the front-end opposite opening of the downstream-side honeycomb-shaped support was positioned away from the rear-end opposite opening of the intermediate honeycomb-shaped support by a distance of 20 mm.

Thereafter, the mantle was fastened to the upstream-side, intermediate and downstream honeycomb-shaped supports which were fitted into the mantle by brazing in the following manner. The fastening by brazing was carried out using a heat-resistant Ni-based brazing alloy. After applying the heat-resistant Ni-brazing alloy onto an inner peripheral surface of the mantle and onto an outer peripheral surface of the upstream-side, intermediate and downstream honeycomb-shaped supports, the mantle into which the upstream-side, intermediate and downstream-side honeycomb-shaped supports were fitted was heated to a high temperature and held thereat in a vacuum atmosphere. Note that the used brazing alloy comprised Cr in an amount of 18% by weight, Si in an amount of 10% by weight, and the balance of Ni and inevitable impurities.

The following were used to prepare a slurry: 65 parts by weight of alumina ($Al_2O_3$); 25 parts by weight of ceria ($CeO_2$); 5 parts by weight of zirconia ($ZrO_2$); 5 parts by weight of a binder; and 100 parts by weight of water. The raw materials were mixed uniformly to prepare a slurry.

The resulting slurry was coated on a surface of the three honeycomb-shaped substrates, the upstream-side honeycomb-shaped support, the intermediate honeycomb-shaped support and the downstream-side honeycomb-shaped support, in a coating amount of 50 g/cm$^2$, respectively. After drying the coated slurry, the support assembly was calcined at 500° C. for 1 hour. Thus, an upstream-side loading layer, an intermediate loading layer and a downstream-side loading layer were formed on the upstream-side honeycomb-shaped support, the intermediate honeycomb-shaped support and the downstream-side honeycomb-shaped support, respectively.

Then, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the three loading layers, the upstream-side loading layer, the intermediate loading layer and the downstream-side loading layer, in a loading amount of 0.8 g and 0.16 g with respect to 1 L of an apparent volume of the three honeycomb-shaped supports, the upstream-side honeycomb-shaped support, the intermediate honeycomb-shaped support and the downstream-side honeycomb-shaped support, respectively.

Thereafter, a rhodium nitrate aqueous solution was further prepared. Only the upstream-side honeycomb-shaped support of the support assembly was immersed into the rhodium nitrate aqueous solution. After taking up the upstream-side honeycomb-shaped support of the support assembly from the rhodium nitrate aqueous solution and drying it, the support assembly was calcined. Note that the calcination was carried out by heating the support assembly at 300° C. for 1 hour. When the process was completed, Rh was further loaded on the upstream-side loading layer in an extra loading amount of 0.8 g with respect to 1 L of an apparent volume of the upstream-side honeycomb-shaped support. That is, Rh was loaded on the upstream-side loading layer in a total loading amount of 0.96 g with respect to 1 L of an apparent volume of the upstream-side honeycomb-shaped support.

Figure 2:
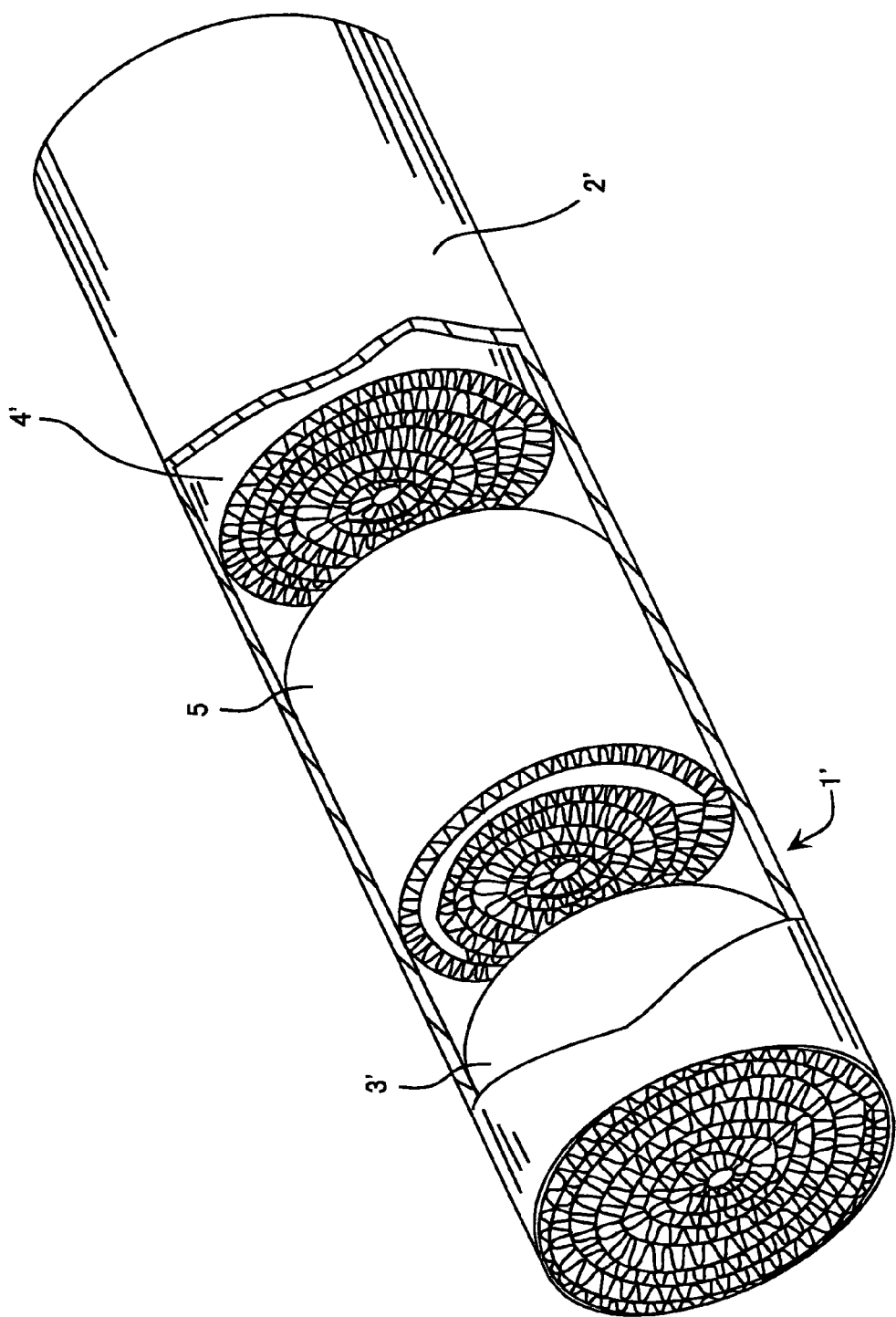
FIG. 2 is a perspective view, which is cut away partially, for illustrating an arrangement of an exhaust-gas purifying catalyst according to Example No. 4 of the present invention.

In accordance with the above-described procedures, an exhaust-gas purifying catalyst according to Example No. 4 was produced. FIG. 2 illustrates the arrangement of the exhaust-gas purifying catalyst according to Example No. 4.

As illustrated in the drawing, the exhaust-gas purifying catalyst 1' according to Example No. 4 comprised the mantle 2', the upstream-side catalyst 3', the intermediate catalyst 5, and the downstream-side catalyst 4'. The upstream-side catalyst 3' was disposed in the mantle 2' on an upstream side with respect to a flow of exhaust gases; the intermediate catalyst 5 was disposed at a position where the upstream-end surface of the intermediate catalyst 5 was positioned away from the downstream-end surface of the upstream-side catalyst 3' at an interval of 20 mm; and the downstream-side catalyst 4' was disposed at a position where the upstream-end surface of the downstream-side catalyst 4' was positioned away from the downstream-end surface of the intermediate catalyst 5 at an interval of 20 mm. Note that the upstream-end surface of the upstream-side catalyst 3' agreed with the upstream-end surface of the mantle 2'; and the downstream-end surface of the downstream-side catalyst 4' agreed with the downstream-end surface of the mantle 2'. Moreover, the upstream-side catalyst 3' comprised the upstream-side honeycomb-shaped support fastened to the mantle 2', and the upstream-side catalytic layer formed on a surface of the upstream-side honeycomb-shaped support; the intermediate catalyst 5 comprised the intermediate honeycomb-shaped support fastened to the mantle 2', and the intermediate catalytic layer formed on a surface of the intermediate honeycomb-shaped support; and the downstream-side catalyst 4' comprised the downstream-side honeycomb-shaped support fastened to the mantle 2', and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pt and Rh loaded on the upstream-side loading layer; the intermediate catalytic layer comprised the intermediate loading layer formed on a surface of the intermediate honeycomb-shaped support, and Pt and Rh loaded on the intermediate loading layer; and the downstream-side catalytic layer comprised the downstream-side loading layer formed on a surface of the downstream-side honeycomb-shaped support, and Pt and Rh loaded on the downstream-side loading layer. Note that Rh was loaded on the upstream-side loading layer in a loading amount of 0.96 g with respect to 1 L of an apparent volume of the upstream-side honeycomb-shaped support.

Table 1 above summarizes the arrangement of the exhaust-gas purifying catalyst according to Example No. 4 as well.

Comparative Example No. 1

First of all, a circle-shaped continuous pipe was prepared which was composed of SUS436L as per Japanese Industrial Standard (JIS). The pipe had a thickness of 1.5 mm, an inside diameter of 50.5 mm, and an outside diameter of 53.5 mm. The pipe was cut to an axial length of 120 mm to manufacture a mantle.

Subsequently, a cylindrical honeycomb-shaped support was manufactured which was composed of the above-described high heat-resistance stainless steel. The honeycomb-shaped support comprised cells in an amount of 31 cells/cm$^2$ (or 200 cells/inch$^2$ approximately), and had a diameter of 50.5 mm and an axial length of 120 mm.

Note that the honeycomb-shaped support was manufactured in the following manner. Two strip-shaped sheets were prepared whose thickness was 100 µm, and were processed into a flat sheet and a corrugated sheet, respectively. The flat sheet and the corrugated sheet were laminated. Then, the laminated flat sheet and corrugated sheet were wound as a roll to manufacture the honeycomb-shaped support.

Then, the honeycomb-shaped support was fitted into the mantle through one of the opposite-end openings of the mantle (hereinafter referred to as a "front-end opposite opening"). Note that the front-end opposite surface of the honeycomb-shaped support was flush with the front-end opposite surface of the mantle when completing the fitting of the honeycomb-shaped support into the mantle.

Thereafter, the honeycomb-shaped support was fastened in the mantle by brazing in the following manner. The fastening by brazing was carried out using a heat-resistant Ni-based brazing alloy. After applying the heat-resistant Ni-brazing alloy onto an inner peripheral surface of the mantle and onto an outer peripheral surface of the honeycomb-shaped support, the mantle into which the honeycomb-shaped support was fitted was heated to a high temperature and held thereat in a vacuum atmosphere. Note that the used brazing alloy comprised Cr in an amount of 18% by weight, Si in an amount of 10% by weight, and the balance of Ni and inevitable impurities.

The following were used to prepare a slurry: 65 parts by weight of alumina ($Al_2O_3$); 25 parts by weight of ceria ($CeO_2$); 5 parts by weight of zirconia ($ZrO_2$); 5 parts by weight of a binder; and 100 parts by weight of water. The raw materials were mixed uniformly to prepare a slurry.

The resulting slurry was coated on a surface of the honeycomb-shaped support in a coating amount of 50 g/cm$^2$. After drying the coated slurry, the support assembly was calcined at 500° C. for 1 hour. Thus, a loading layer was formed on the honeycomb-shaped support.

Then, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the loading layer in a loading amount of 0.8 g and 0.3 g with respect to 1 L of an apparent volume of the honeycomb-shaped support.

In accordance with the above-described procedures, an exhaust-gas purifying catalyst according to Comparative Example No. 1 was produced.

The exhaust-gas purifying catalyst according to Comparative Example No. 1 comprised the mantle, and the single honeycomb-shaped support. The single honeycomb-shaped support was fastened in the mantle. A catalytic layer was formed on a surface of the single honeycomb-shaped support. The catalytic layer comprised the loading layer formed on a surface of the single honeycomb-shaped support, and Pt and Rh loaded on the loading layer. Note that the axial length of the single honeycomb-shaped support, used in the exhaust-gas purifying catalyst according to Comparative Example No. 1, was equal to a sum of the axial length of the upstream-side honeycomb-shaped support and the axial length of the downstream-side honeycomb-shaped support, used in the exhaust-gas purifying catalyst according to Example No. 1. Moreover, in the exhaust-gas purifying catalyst according to Comparative Example No. 1, Pt and Rh were loaded on the loading layer in an amount equal to the total loading amount of Pt and Rh, loaded on the upstream-side loading layer as well as the downstream-side loading layer of the exhaust-gas purifying catalyst according to Example No. 1, respectively.

Table 1 above summarizes the arrangement of the exhaust-gas purifying catalyst according to Comparative Example No. 1 as well.

Comparative Example No. 2

The component members were used whose material qualities and sizes were the same as those of the component members used in Example No. 1. The two honeycomb-shaped supports, the upstream-side support and the downstream-side support, were fastened in the mantle to prepare the support assembly. Then, the upstream-side and downstream-side loading layers were formed on a surface of the two honeycomb-shaped supports, respectively.

Moreover, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the two loading layers, the upstream-side loading layer and the downstream-side loading layer, in a loading amount of 0.8 g and 0.16 g with respect to 1 L of an apparent volume of the two honeycomb-shaped supports, the upstream-side honeycomb-shaped support and the downstream-side honeycomb-shaped support, respectively.

In addition, a palladium nitrate aqueous solution was further prepared. Only the upstream-side honeycomb-shaped support of the support assembly was immersed into the palladium nitrate aqueous solution. After taking up the upstream-side honeycomb-shaped support of the support assembly from the palladium nitrate aqueous solution and drying it, the support assembly was calcined. Note that the calcination was carried out by heating the support assembly at 300° C. for 1 hour. When the process was completed, Pd was further loaded on the upstream-side loading layer in a loading amount of 1.6 g with respect to 1 L of an apparent volume of the upstream-side honeycomb-shaped support.

In accordance with the above-described procedures, an exhaust-gas purifying catalyst according to Comparative Example No. 2 was produced.

The exhaust-gas purifying catalyst according to Comparative Example No. 2 comprised the mantle, the upstream-side catalyst, and the downstream-side catalyst. The upstream-side catalyst was disposed in the mantle on an upstream side with respect to a flow of exhaust gases; and the downstream-side catalyst was disposed at a position where the upstream-end surface of the downstream-side catalyst was positioned away from the downstream-end surface of the upstream-side catalyst at an interval of 20 mm. Note that the upstream-end surface of the upstream-side catalyst agreed with the upstream-end surface of the mantle; and the downstream-end surface of the downstream-side catalyst agreed with the downstream-end surface of the mantle. Moreover, the upstream-side catalyst comprised the upstream-side honeycomb-shaped support fastened to the mantle, and the upstream-side catalytic layer formed on a surface of the upstream-side honeycomb-shaped support; and the downstream-side catalyst comprised the downstream-side honeycomb-shaped support fastened to the mantle, and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pt, Rh and Pd loaded on the upstream-side loading layer; and the downstream-side catalytic layer comprised the downstream-side loading layer formed on a surface of the downstream-side honeycomb-shaped support, and Pt and Rh loaded on the downstream-side loading layer. Note that Rh was loaded on the upstream-side loading layer in a loading amount of 0.16 g with respect to 1 L of an apparent volume of the upstream-side honeycomb-shaped support.

Table 1 above summarizes the arrangement of the exhaust-gas purifying catalyst according to Comparative Example No. 2 as well.

Comparative Example No. 3

The component members were used whose material qualities and sizes were the same as those of the component members used in Example No. 1. The two honeycomb-shaped supports, the upstream-side support and the downstream-side support, were fastened in the mantle to prepare the support assembly. Then, the upstream-side and downstream-side loading layers were formed on a surface of the two honeycomb-shaped supports, respectively.

Moreover, a rhodium nitrate aqueous solution and a platinum nitrate aqueous solution were mixed to prepare a mixture aqueous solution. The support assembly was immersed into the resultant mixture aqueous solution. After taking up the support assembly from the mixture aqueous solution and drying it, the support assembly was calcined. Note that the calcination was carried out by heating the support assembly at 300° C. for 1 hour. When the process was completed, Pt and Rh were loaded on the two loading layers, the upstream-side loading layer and the downstream-side loading layer, in a loading amount of 0.8 g and 0.16 g with respect to 1 L of an apparent volume of the two honeycomb-shaped supports, the upstream-side honeycomb-shaped support and the downstream-side honeycomb-shaped support, respectively.

In addition, a platinum nitrate aqueous solution was further prepared. Only the upstream-side honeycomb-shaped support of the support assembly was immersed into the platinum nitrate aqueous solution. After taking up the upstream-side honeycomb-shaped support of the support assembly from the platinum nitrate aqueous solution and drying it, the support assembly was calcined. Note that the calcination was carried out by heating the support assembly at 300° C. for 1 hour. When the process was completed, Pt was further loaded on the upstream-side loading layer in an extra loading amount of 1.6 g with respect to 1 L of an apparent volume of the upstream-side honeycomb-shaped support. That is, Pt was loaded on the upstream-side loading layer in a total loading amount of 2.4 g with respect to 1 L of an apparent volume of the upstream-side honeycomb-shaped support.

In accordance with the above-described procedures, an exhaust-gas purifying catalyst according to Comparative Example No. 3 was produced.

The exhaust-gas purifying catalyst according to Comparative Example No. 3 comprised the mantle, the upstream-side catalyst, and the downstream-side catalyst. The upstream-side catalyst was disposed in the mantle on an upstream side with respect to a flow of exhaust gases; and the downstream-side catalyst was disposed at a position where the upstream-end surface of the downstream-side catalyst was positioned away from the downstream-end surface of the upstream-side catalyst at an interval of 20 mm. Note that the upstream-end surface of the upstream-side catalyst agreed with the upstream-end surface of the mantle; and the downstream-end surface of the downstream-side catalyst agreed with the downstream-end surface of the mantle. Moreover, the upstream-side catalyst comprised the upstream-side honeycomb-shaped support fastened to the mantle, and the upstream-side catalytic layer formed on a surface of the upstream-side honeycomb-shaped support; and the downstream-side catalyst comprised the downstream-side honeycomb-shaped support fastened to the mantle, and the downstream-side catalytic layer formed on a surface of the downstream-side honeycomb-shaped support. In addition, the upstream-side catalytic layer comprised the upstream-side loading layer formed on a surface of the upstream-side honeycomb-shaped support, and Pt and Rh loaded on the upstream-side loading layer; and the downstream-side catalytic layer comprised the downstream-side loading layer formed on a surface of the downstream-side honeycomb-shaped support, and Pt and Rh loaded on the downstream-side loading layer. Note that Pt and Rh were loaded on the upstream-side loading layer in a loading amount of 2.4 g and 0.16 g with respect to 1 L of an apparent volume of the upstream-side honeycomb-shaped support, respectively.

Table 1 above summarizes the arrangement of the exhaust-gas purifying catalyst according to Comparative Example No. 3 as well.

Assessment

The exhaust-gas purifying catalysts according to Example Nos. 1 through 4 and Comparative Example Nos. 1 through 3 were examined for the ignition performance and the purifying performance.

Firstly, the exhaust-gas purifying catalysts according to Example Nos. 1 through 4 and Comparative Example Nos. 1 through 3 were assembled with an exhaust system of an automotive engine testing bench equipped with an engine whose displacement was 2,000 c.c., respectively. Then, the engine was started to subject the exhaust-gas purifying catalysts to a durability test for 100 hours while running the engine at a revolving speed of 5,000 rpm and setting the inlet exhaust-gas temperature at 800° C.

The respective exhaust-gas purifying catalysts, which had been subjected to the durability test, were mounted on an exhaust system of an actual vehicle (e.g., a two-wheeled vehicle) equipped with a 4-stroke engine whose displacement was 0.4 L. The engine was driven under the running conditions prescribed in ECE40 (or ISO6460), and exhaust gases emitted from the engine were passed through the exhaust-gas purifying catalysts. Simultaneously with starting the engine, the bag sampling was started in which the exhaust gases, which had passed through the exhaust-gas purifying catalysts and had been emitted therefrom, were collected. Note that the bag sampling was carried out in the following manner. The exhaust gases were collected with the first bag in the first and second cycles of the ECE40 mode; and they were collected with the second bag in the third through sixth cycles thereof. The CO contents of the exhaust gases, which were collected in the first and second bags, that is, the CO emission values were measured. Table 2 below and FIG. 3 show the measurement results.

TABLE 2

| | CO Emission (g/km) | |
|---|---|---|
| | First Bag | Second Bag |
| Ex. #1 | 1.2 | 0.4 |
| Ex. #2 | 1.0 | 0.3 |
| Ex. #3 | 1.3 | 0.5 |
| Ex. #4 | 1.1 | 0.4 |
| Comp. Ex. #1 | 2.8 | 0.8 |
| Comp. Ex. #2 | 2.0 | 1.0 |
| Comp. Ex. #3 | 2.5 | 0.9 |

Figure 3:
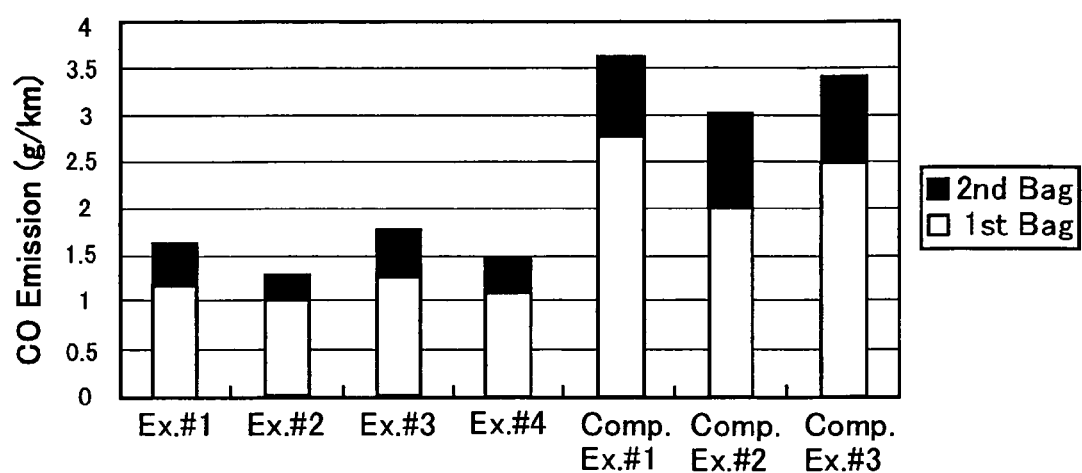
FIG. 3 is a graph for illustrating the results of measurements for evaluating ignition performance and purifying performance which were exhibited by the exhaust-gas purifying catalysts according to Example Nos. 1 through 4 of the present invention as well as exhaust-gas purifying catalysts according Comparative Example Nos. 1 through 3.

When comparing the CO emission values in the exhaust gases collected in the first bags, as can be appreciated from Table 2 and FIG. 3, the CO emission values in the exhaust gases emitted from the exhaust-gas purifying catalysts according to Example Nos. 1 through 4 were remarkably smaller values than the CO emission values in the exhaust gases emitted from the exhaust-gas purifying catalysts according to Comparative Example Nos. 1 through 3. Note that a smaller CO emission value in exhaust gases collected in the first bag indicates that an exhaust-gas purifying catalyst is better in terms of the ignition performance, because the first bag collects exhaust gases emitted from engines upon or immediately after starting the engines. Therefore, it is understood that the exhaust-gas purifying catalysts according to Example Nos. 1 through 4 exhibited better ignition performance.

Moreover, when comparing the CO emission values in the exhaust gases collected in the second bags, the comparison results were similar to those relating to the first bags. Specifically, the CO emission values in the exhaust gases emitted from the exhaust-gas purifying catalysts according to Example Nos. 1 through 4 were remarkably smaller values than the CO emission values in the exhaust gases emitted from the exhaust-gas purifying catalysts according to Comparative Example Nos. 1 through 3. Note that a small CO emission value in exhaust gases collected in the second bag indicates that an exhaust-gas purifying catalyst is better in terms of the purifying performance, because the second bag collects exhaust gases emitted from engines in the third through sixth cycles of the ECE40 mode, that is, after the ignition. Therefore, it is understood that the exhaust-gas purifying catalysts according to Example Nos. 1 through 4 exhibited better exhaust-gas purifying performance.

Note that the exhaust-gas purifying catalyst according to Example No. 4 is an example which comprises two honeycomb-shaped supports in addition to the first honeycomb-shaped support recited in the accompanying claims according to the present invention. The exhaust-gas purifying catalyst according to Example No. 4 likewise exhibited enhanced ignition performance and purifying performance, because the most-upstream-side catalytic layer, which was disposed on the most upstream side of the exhaust-gas purifying catalyst with respect to the flow of exhaust gases, comprised Rh in a sufficient loading amount. Note that the present catalytic layer, disposed on a surface of the first honeycomb-shaped support, includes the most-upstream-side catalytic layer. The fact implies that, as far as an adequate amount of Rh is loaded on the catalytic layer disposed on a surface of the first honeycomb-shaped support, the present exhaust-gas purifying catalyst can show upgraded ignition performance and purifying performance even when it comprises two or more honeycomb-shaped supports in addition to the first honeycomb-shaped support.

Thus, the exhaust-gas purifying catalysts according to Example Nos. 1 through 4 were good in terms of the ignition performance and purifying performance.

Having now fully described the present invention, it will be apparent to one of ordinary skill in the art that many changes and modifications can be made thereto without departing from the spirit or scope of the present invention as set forth herein including the appended claims.

What is claimed is:

1. An exhaust-gas purifying catalyst, comprising:
   a mantle;
   at least three honeycomb-shaped supports fastened in the mantle so as to be separated at intervals, and comprising a first honeycomb-shaped support disposed on a most upstream side of the mantle with respect to a flow of exhaust gases at least two honeycomb-shaped supports disposed next to the first honeycomb-shaped support on a downstream side of the mantle with respect to the flow of exhaust gases; and
   a catalytic layer disposed on a surface of the at least three honeycomb-shaped supports, and comprising a loading layer formed on a surface of the at least three honeycomb-shaped supports and a catalytic ingredient loaded on the loading layer, the catalytic layer disposed on a surface of the first honeycomb-shaped support including at least rhodium (Rh) as the catalytic ingredient in a loading amount of 0.8 g or more with respect to 1 L of an apparent volume of the first honeycomb-shaped support, wherein the catalytic layer disposed on the surface of the at least three honeycomb-shaped supports excepting the first honeycomb-shaped support includes Rh as the catalytic ingredient in a loading amount less than that of the catalytic layer disposed on the first honeycomb-shaped support by a factor of from 0.5 to 0.7.

2. The exhaust-gas purifying catalyst of claim 1, wherein the first honeycomb-shaped support has an axial length of from 10 to 30 mm.

3. The exhaust-gas purifying catalyst of claim 1, wherein a summed axial length of the at least three honeycomb-shaped supports excepting the first honeycomb-shaped support is longer than that of the first honeycomb-shaped support.

4. The exhaust-gas purifying catalyst of claim 1, wherein an axial length of the at least two honeycomb-shaped supports disposed next to the first honeycomb-shaped support is longer than that of the first honeycomb-shaped support.

5. The exhaust-gas purifying catalyst of claim 4, wherein the axial length of the at least two honeycomb-shaped supports is longer than that of the first honeycomb-shaped support by from 20 to 150 mm.

6. The exhaust-gas purifying catalyst of claim 1, wherein the interval between the first honeycomb-shaped support and the at least two honeycomb-shaped supports disposed next to the first honeycomb-shaped support falls in a range of from 5 to 50 mm.

7. The exhaust-gas purifying catalyst of claim 1, wherein the at least three honeycomb-shaped supports are made of metal.

8. The exhaust-gas purifying catalyst of claim 1, wherein the mantle is made of metal.

9. The exhaust-gas purifying catalyst of claim 1, wherein the catalytic layer disposed on the surface of the first honeycomb-shaped support further includes at least one member selected from the group consisting of platinum (Pt) and palladium (Pd) as the catalytic ingredient in a loading amount of from 0.5 to 2.0 g and from 0.5 to 2.0 g, respectively, with respect to 1 L of an apparent volume of the first honeycomb-shaped support.

10. The exhaust-gas purifying catalyst of claim 1, wherein the catalytic layer disposed on the surface of the at least three honeycomb-shaped supports excepting the first honeycomb-shaped support further includes at least one member selected from the group consisting of Pt and Pd as the catalytic ingredient in a loading amount of from 0.5 to 2.0 g and from 0.5 to 2.0 g, respectively, with respect to 1 L of an apparent volume of each of the at least three honeycomb-shaped supports.

11. The exhaust-gas purifying catalyst of claim 1, wherein the catalytic layer disposed on the surface of the at least three honeycomb-shaped supports excepting the first honeycomb-shaped support includes Rh as the catalytic ingredient in a loading amount of from 0.2 to 0.5 g with respect to 1 L of an apparent volume of the first catalyst.

12. The exhaust-gas purifying catalyst of claim 11, wherein the catalytic layer disposed on the surface of the at least three honeycomb-shaped supports excepting the first honeycomb-shaped support further includes at least one member selected from the group consisting of Pt and Pd as the catalytic ingredient in a loading amount of from 0.5 to 2.0 g and from 0.5 to 2.0 g, respectively, with respect to 1 L of an apparent volume of each of the at least three honeycomb-shaped supports.

* * * * *